(12) United States Patent
Gareau et al.

(10) Patent No.: US 12,445,196 B2
(45) Date of Patent: Oct. 14, 2025

(54) MESSAGING CHANNEL IN A COHERENT OPTICAL DSP FRAME

(71) Applicant: Ciena Corporation, Hanover, MD (US)

(72) Inventors: Sebastien Gareau, Ottawa (CA); Timothy James Creasy, Manotick (CA)

(73) Assignee: Ciena Corporation, Hanover, MD (US)

( * ) Notice: Subject to any disclaimer, the term of this patent is extended or adjusted under 35 U.S.C. 154(b) by 254 days.

(21) Appl. No.: 18/256,031

(22) PCT Filed: Dec. 9, 2021

(86) PCT No.: PCT/US2021/062597
§ 371 (c)(1),
(2) Date: Jun. 5, 2023

(87) PCT Pub. No.: WO2022/125769
PCT Pub. Date: Jun. 16, 2022

(65) Prior Publication Data
US 2024/0048235 A1 Feb. 8, 2024

Related U.S. Application Data

(63) Continuation of application No. 17/383,897, filed on Jul. 23, 2021, now Pat. No. 11,658,737, and a
(Continued)

(51) Int. Cl.
*H04B 10/61* (2013.01)
*H04B 10/07* (2013.01)
(Continued)

(52) U.S. Cl.
CPC ............ *H04B 10/07* (2013.01); *H04B 10/40* (2013.01); *H04B 10/616* (2013.01); *H04J 3/14* (2013.01);
(Continued)

(58) Field of Classification Search
CPC .......................................... H04B 10/60–69973
See application file for complete search history.

(56) References Cited

U.S. PATENT DOCUMENTS

| RE38,619 E | 10/2004 | Paratore et al. |
| 6,839,858 B1 | 1/2005 | James et al. |

(Continued)

FOREIGN PATENT DOCUMENTS

| EP | 0 212 701 A1 | 3/1987 |
| EP | 2 983 314 A1 | 2/2016 |
| EP | 2 996 270 A1 | 3/2016 |

OTHER PUBLICATIONS

Roberts, et al., "Flexible Transceivers," ECOC Technical Digest, 2012 OSA, pp. 1-3.
(Continued)

*Primary Examiner* — Nathan M Cors
(74) *Attorney, Agent, or Firm* — Baratta Law PLLC; Lawrence A. Baratta, Jr.

(57) ABSTRACT

Systems and methods include receiving (102) a plurality of symbols that are part of a defined Digital Signal Processing (DSP) frame for coherent optical communication, wherein the DSP frame structure has a messaging channel incorporated therein that includes a subset of the plurality of symbols; capturing (104) multiple samples of the messaging channel; and determining (106) a message in the messaging channel based on analysis of the multiple samples. The method can further include transmitting (108), in the messaging channel, a reply to the message with the reply being repeated multiple times. The analysis is performed prior to Forward Error Correction (FEC) decoding on the data path.

18 Claims, 9 Drawing Sheets

Related U.S. Application Data continuation of application No. 17/117,289, filed on Dec. 10, 2020, now Pat. No. 11,552,722.

(51) Int. Cl.
*H04B 10/40* (2013.01)
*H04J 3/14* (2006.01)
*H04L 25/49* (2006.01)
*H04L 49/9057* (2022.01)

(52) U.S. Cl.
CPC ...... *H04L 25/4908* (2013.01); *H04L 49/9057* (2013.01); *H04J 2203/006* (2013.01)

(56) References Cited

U.S. PATENT DOCUMENTS

| | | |
|---|---|---|
| 6,868,092 B1 | 3/2005 | Bell et al. |
| 6,986,097 B1 | 1/2006 | Ireland et al. |
| 7,003,708 B1 | 2/2006 | Ireland et al. |
| 7,039,854 B1 | 5/2006 | Ireland et al. |
| 7,058,876 B1 | 6/2006 | Ireland et al. |
| 7,073,117 B1 | 7/2006 | Ireland et al. |
| 7,085,281 B2 | 8/2006 | Thomas et al. |
| 7,096,408 B1 | 8/2006 | Ireland et al. |
| 7,181,545 B2 | 2/2007 | Dziawa et al. |
| 7,835,366 B2 | 11/2010 | Aweya et al. |
| 8,306,420 B2 | 11/2012 | Conklin et al. |
| 8,331,793 B2 | 12/2012 | Takeuchi et al. |
| 8,356,233 B2 | 1/2013 | Nichols et al. |
| 8,370,704 B2 | 2/2013 | Ganga et al. |
| 8,458,560 B2 | 6/2013 | Nichols |
| 8,594,018 B2 | 11/2013 | Richards et al. |
| 8,630,315 B2 | 1/2014 | Rivaud et al. |
| 8,718,471 B2 | 5/2014 | Prakash et al. |
| 8,732,358 B2 | 5/2014 | Nichols et al. |
| 8,737,389 B2 | 5/2014 | Chiesa et al. |
| 8,830,993 B1 | 9/2014 | Dublin et al. |
| 8,848,533 B1 | 9/2014 | Stuart et al. |
| 8,867,913 B2 | 10/2014 | Gareau et al. |
| 9,264,139 B2 | 2/2016 | Young et al. |
| 9,432,144 B2 | 8/2016 | Gareau et al. |
| 9,825,883 B2 | 11/2017 | Nichols et al. |
| 9,980,021 B2 | 5/2018 | Oltman et al. |
| 10,014,937 B1 | 7/2018 | Di Mola et al. |
| 10,063,336 B1 | 8/2018 | Moynihan et al. |
| 10,097,480 B2 | 10/2018 | Gareau et al. |
| 10,135,760 B2 | 11/2018 | Gareau |
| 10,193,688 B2 | 1/2019 | Gareau et al. |
| 10,218,823 B2 | 2/2019 | Gareau |
| 10,225,037 B2 | 3/2019 | Gareau |
| 10,256,909 B2 | 4/2019 | Gareau et al. |
| 10,313,103 B1 | 6/2019 | Perras et al. |
| 10,382,167 B2 | 8/2019 | Gareau et al. |
| 10,396,972 B1 | 8/2019 | Gareau et al. |
| 10,397,088 B2 | 8/2019 | Gareau |
| 10,425,177 B2 | 9/2019 | Gareau et al. |
| 10,498,476 B2 | 12/2019 | Gareau et al. |
| 10,567,352 B2 | 2/2020 | Gareau et al. |
| 10,594,395 B2 | 3/2020 | Abdullah et al. |
| 10,673,782 B2 | 6/2020 | Gareau et al. |
| 10,750,260 B1 | 8/2020 | Gareau |
| 10,826,600 B2 | 11/2020 | Ibach et al. |
| 10,868,662 B2 | 12/2020 | Gareau et al. |
| 11,368,229 B2 * | 6/2022 | Hueda ............... H04B 10/6161 |
| 11,387,929 B1 * | 7/2022 | Zhang ............... H04B 10/6166 |
| 11,658,737 B2 * | 5/2023 | Gareau ............... H04L 49/9057 398/58 |
| 2004/0006645 A1 | 1/2004 | Dziawa et al. |
| 2005/0102419 A1 | 5/2005 | Popescu et al. |
| 2006/0007943 A1 | 1/2006 | Fellman |
| 2006/0109805 A1 | 5/2006 | Malamal Vadakital et al. |
| 2007/0071456 A1 | 3/2007 | Chen et al. |
| 2008/0069248 A1 | 3/2008 | Heise et al. |
| 2009/0060511 A1 * | 3/2009 | Toyoshima ............... H04L 7/033 398/74 |
| 2009/0297164 A1 | 12/2009 | Horiuchi |
| 2010/0042883 A1 | 2/2010 | Heise |
| 2010/0150243 A1 | 6/2010 | Kure et al. |
| 2010/0238836 A1 | 9/2010 | Diab et al. |
| 2011/0019681 A1 | 1/2011 | Gazier et al. |
| 2011/0252265 A1 | 10/2011 | Iwami et al. |
| 2011/0255546 A1 | 10/2011 | Pallee et al. |
| 2011/0274149 A1 | 11/2011 | Xu et al. |
| 2012/0213508 A1 | 8/2012 | Moynihan |
| 2012/0219005 A1 | 8/2012 | Durve et al. |
| 2012/0224846 A1 | 9/2012 | Swanson et al. |
| 2013/0045005 A1 | 2/2013 | Nakura et al. |
| 2013/0129345 A1 | 5/2013 | Meng et al. |
| 2013/0136218 A1 | 5/2013 | Kure et al. |
| 2013/0266312 A1 | 10/2013 | Prakash et al. |
| 2013/0272143 A1 | 10/2013 | Schoppmeier |
| 2013/0301634 A1 | 11/2013 | Ehlers et al. |
| 2013/0308349 A1 | 11/2013 | Young et al. |
| 2013/0308943 A1 | 11/2013 | Young et al. |
| 2014/0079409 A1 | 3/2014 | Ruffini et al. |
| 2014/0093235 A1 | 4/2014 | Gareau et al. |
| 2014/0177653 A1 | 6/2014 | Tzeng |
| 2014/0219651 A1 | 8/2014 | Ruffini et al. |
| 2014/0269778 A1 | 9/2014 | Yang et al. |
| 2014/0348184 A1 | 11/2014 | Kure |
| 2015/0055664 A1 | 2/2015 | Kanonakis et al. |
| 2016/0323164 A1 | 11/2016 | Cao |
| 2019/0190648 A1 | 6/2019 | Reimer et al. |
| 2019/0305854 A1 | 10/2019 | Campos et al. |
| 2020/0028585 A1 | 1/2020 | Abdullah et al. |
| 2020/0153529 A1 | 5/2020 | Su et al. |
| 2020/0177361 A1 | 6/2020 | Gareau et al. |
| 2020/0358722 A1 | 11/2020 | Gareau et al. |
| 2020/0396050 A1 | 12/2020 | Perras et al. |
| 2021/0119894 A1 | 4/2021 | DeAndrea et al. |

OTHER PUBLICATIONS

Roberts, et al., "100G and Beyond with Digital Coherent Signal Processing," IEEE Communications Magazine, Jul. 2010, pp. 62-69.
Garner, "IEEE 1588 Version 2," ISPCS, Sep. 24, 2008, slides 1-89.
Gho, et al., "Rate-Adaptive Coding for Optical Fiber Transmission Systems," Journal of Lightwave Technology, vol. 29, No. 2, Jan. 15, 2011, pp. 222-233.
ITU-T, Telecommunication Standardization Sector of ITU, "Precision time protocol telecom profile for frequency synchronization," International Telecommunication, Jul. 2014, pp. 1-28.
Jan. 8, 2016 European Search Report for European Patent Application No. EP 15 18 2272.
Gustlin et al., "What is FlexEthernet?" Ethernet Technology Summit.
Vusirikala, "FlexEthernet (FlexE) Use Cases," TEF: The Rate Debate.
Gustlin, "FlexEthernet—Protocols and Components," XILINX All Programmable, Oct. 16, 2014.
OIF Optical Internetworking Forum, "FlexE Implementation Agreement—Draft 1.1," Optical Internetworking Forum, Jul. 2015.
ITU, Telecommunication Standardization Sector of ITU, "Architecture of Ethernet layer networks," International Telecommunication Union, Feb. 2004.
Stephen J. Trowbridge, Alcatel-Lucent USA, Mapping, of Flex Ethernet Clients over OTN, International Telecommunication Union, COM 15-C 1213-E, Study Period 2013-2016, vol. 11/15, Jun. 2015, pp. 1-7.
Marteen Vissers, Huawei Technologies Co., Ltd., Considerations on the mapping of FlexE Client and Subrate signals into OTN, International Telecommunication Union, COM 15-C 1195-E, Study Period 2013-2016, vol. 11/15, Jun. 2015, pp. 1-13.
OIF Optical Internetworking Forum, IA OIF-MLG-02.0, Multi-Link Gearbox Implementation Agreement, Apr. 2013, pp. 1-40.
European Search Report Issued in European Application EP 16177286, dated Oct. 21, 2016.
Aug. 6, 2018 European Search Report issued for International Application No. EP18176943.

(56) References Cited

OTHER PUBLICATIONS

Li Xueqiao et al., "Implementation and research of hardware time stamping techniques based on IEEE1588," May 27, 2011, pp. 6-9.
Sluyski et al., OIF, Implementation Agreement 400ZR, OIF-400ZR-01.0, Mar. 10, 2020, pp. 1-100.
Sluyski, Open ROADM, Open ROADM MSA 3.01 W-Port Digital Specification (200G-400G), Open ROADM-Draft document, MSA_3.01 W-Port Digital Specification, Jun. 25, 2019, pp. 1-56.
Srivastava et al., Open ZR+ MSA, Technical Specification, version 1.0, Sep. 4, 2020, pp. 1-74.
ITU-T, Telecommunication Standardization Sector of ITU, Flexible OTN long-reach interfaces, G.709.3/Y.1331.3, Jun. 2018, pp. 1-34.
ITU-T, Telecommunication Standardization Sector of ITU, Flexible OTN long-reach interfaces, Amendment 1, G.709.3/Y.1331.3, Nov. 2018, pp. 1-74.
Mike A. Sluyski, "Open ROADM MSA 3.01 W-Port Digital Specification (200G-400G)", Open ROADM—Draft document , Jun. 25, 2019, pp. 1-56.
Atul Srivastava et al.,, "Open ZR+ MSA", Technical Specification, Version 1.0, Sep. 4, 2020, pp. 1-74.
Telecommunication Standardization Sector of ITU, ITU-T G.709.3/Y.1331.3, "Flexible OTN long-reach interfaces", Jun. 2018, pp. 1-34.
Mike A. Sluyski et al., OIF, "Implementation Agreement 400ZR," OIF-400ZR-01.0, Mar. 10, 2020, pp. 1-100.
Apr. 4, 2022, International Search Report for International Patent Application No. PCT/US2021/062597.

* cited by examiner

FIG. 5

MESSAGING CHANNEL IN A COHERENT OPTICAL DSP FRAME

FIELD OF THE DISCLOSURE

The present disclosure generally relates to optical networking. More particularly, the present disclosure relates to systems and methods for a messaging channel within a coherent optical Digital Signal Processing (DSP) frame.

BACKGROUND OF THE DISCLOSURE

Coherent optical modem deployments are exploding in optical networks, used for a variety of Optical Transport Network (OTN), Flexible Optical (FlexO), and Ethernet applications. These enable 100 Gb/s, 200 Gb/s, 400 Gb/s, 600 Gb/s, 800 Gb/s and beyond to meet the ever-growing network demand. Until recently, deployments focused on proprietary vendor implementations. Work is underway to define specifications, standards, and Implementation Agreements to support interoperability and multi-vendor implementations. Each specification defines a coherent optical DSP frame, such interfaces are now standardized in G.709.3/Y.1331.3 (06/18), and G.709.3/Y.1331.3 Amendment 1 (11/18), "Flexible OTN long-reach interfaces," and in OIF Implementation Agreement 400ZR, OIF-400ZR-01.0, Mar. 10, 2020; the contents of each are incorporated by reference herein. There is another coherent optical Ethernet interface referred to as OpenZR+ (available at www.openzrplus.org) and described in the OpenZR+ Specifications, v. 1.0, 4 Sep. 2020; the contents are incorporated by reference. Also, IEEE is now also looking at using coherent technology for 400GBASE-ZR and future 800G interfaces. These various DSP frame standards are collectively referred to as DSP frames, and each generally includes a similar structure to one another.

A DSP frame is a definition of symbols, i.e., a symbol structure. Symbols can be points on a Quadrature Amplitude Modulation (QAM) signal constellation, and each symbol can represent more than one bit of information, e.g., in 16-QAM, each symbol represents four bits. The DSP frame is used for coherent modulation/demodulation, absolute phase, signal recovery using training, etc. For example, the 400ZR definition includes a DSP super-frame is defined as a set of 181888 symbols in each of the X/Y polarization, a DSP sub-frame consists of 3712 symbols, and a DSP super-frame thus consists of 49 DSP sub-frames There is currently no specification for an in-band messaging channel using overhead in the DSP frame structure. Existing protocol layer communication channels are not accessible before having a DSP layer (and most of the Physical Coding Sublayer (PCS) sublayer) up and running, i.e., a stable bi-directional physical link. These lead to the proverbial "chicken-and-egg" issue where it could take milliseconds or even seconds to get a stable bi-directional physical link. This is not ideal for tweaks with DSP settings and for sharing other data before a stable link, e.g., unique identifiers.

Timing synchronization between nodes in a network is described in various standards such as IEEE 1588-2008 "Standard for a Precision Clock Synchronization Protocol for Networked Measurement and Control Systems," ITU-T G.8265.1/Y.1365.1 (07/14) "Precision time protocol telecom profile for frequency synchronization," ITU-T G.8275.1 "Time and Phase Profile," the contents of each is incorporated by reference herein. The requisite information for the transfer of precise time is (1) a timing reference point, or "significant instant" to which timing information can be related, (2) the timing information itself, and (3) a measure of the delay it takes to transfer the timing information between two nodes. IEEE Standard 1588-2008 for a Precision Clock Synchronization Protocol for Networked Measurement and Control Systems, the contents of which are incorporated by reference herein, is referred to as Precision Time Protocol (PTP) and is used to synchronize clocks throughout the network. IEEE 1588-2008 only defines a protocol for transferring time information over a packet network. It does not address performance aspects such as the time accuracy that can be achieved over a network. In general, PTP supports accuracy in the sub-microsecond range. IEEE 1588 supports PTP over Ethernet, and PTP is described over Optical Transport Network (OTN) in G.709N.1331 (06/20), "Interfaces for the optical transport network," the contents of which are incorporated by reference herein. PTP has also been described with reference to Flexible Ethernet, such as in commonly-assigned U.S. Pat. No. 10,673,782, issued Jun. 2, 2020, and entitled "Time transfer systems and methods over Flexible Ethernet," the contents of which are incorporated by reference herein.

These time transfer approaches are protocol-based and do not account for Forward Error Correction (FEC) and DSP mappings in optical networks, causing non-deterministic timing delays. The transfer of time over optical networks can be challenging because of the delays introduced by elastic First-In-First-Out (FIFOs) required in transport mapping schemes such as OTN and enhanced high coding gain soft-decision Forward Error Correction (SD-FEC) schemes. Uncertainty in these delays (at start-up or after fault recovery) results in uncertainty in the transferred time. Also, uncertainty in these delays result in time error between the network nodes. Coherent optical interfaces (enabled by coherent optical modules) are used for a variety of OTN and Ethernet applications. Such interfaces are now standardized in G.709.3/Y.1331.3 (06/18), and G.709.3/Y.1331.3 Amendment 1 (11/18), "Flexible OTN long-reach interfaces," and in OIF Implementation Agreement 400ZR, OIF-400ZR-01.0, Mar. 10, 2020, the contents of each are incorporated by reference herein. Also, IEEE is now also looking at using coherent technology for 400GBASE-ZR and future ZR/LR 800G interfaces. Commonly-assigned U.S. Pat. No. 9,432,144, issued Aug. 30, 2016, and entitled "Precision time transfer systems and methods in optical networks," the contents of which are incorporated by reference herein, describes a solution for incorporating timing reference points in the FEC layer to account for FEC delays.

As well, the adaptation to FEC, digital DSP frames, such as in G.709.3 and 400ZR, add to delay uncertainty. These complex devices often operate with a gapped clock (data valid), resulting in data path jitter and uncertainty. All these uncertainties in these delays (at start-up or after fault recovery) results in uncertainty in the transferred time, which is often referred as constant time error (cTE).

BRIEF SUMMARY OF THE DISCLOSURE

The present disclosure relates to systems and methods for a messaging channel in a coherent optical Digital Signal Processing (DSP) frame. The messaging channel is a communications channel, signaling channel, etc. Traditionally, communications channels are at the protocol layer, post Forward Error Correction (FEC) after there is a stable bi-directional physical link. The present disclosure defines the messaging channel (i.e., communications channel) pre-FEC at a DSP symbol level, withing a Physical Media Attachment (PMA) sublayer. The messaging channel includes various approaches for robustness across an otherwise unprotected (FEC) set of bits. The degree of robustness can be traded off against computational complexity and detection latency, according to system requirements—in a way that is not possible with existing protocol overhead channels. The messaging channel can be used for a variety of functions including advertising vendor identification, module information, assisting in DSP acquisition, polarization XNI/Q tributary mappings, clock recovery settings, bandwidth, and the like. This could be used to speed up signal acquisition.

In an embodiment, coherent optical modem includes circuitry configured to receive a plurality of symbols that are part of a defined Digital Signal Processing (DSP) frame structure for coherent optical communication, wherein the DSP frame has a messaging channel included therein that includes a subset of the plurality of symbols, capture samples of the messaging channel, and determine a message in the messaging channel based on analysis of the samples.

The circuitry can be further configured to transmit, in the messaging channel, a reply to the message in a robust manner. The robust manner can include any of the reply is repeated on any of different polarizations, different DSP frames, and different symbols in a same DSP frame, and use of symbols in the messaging channel for any of parity, Cyclic Redundancy Check (CRC), and Forward Error Correction (FEC). The determination of the message is performed prior to Forward Error Correction (FEC) decoding on the data path. The messaging channel is available prior to the coherent optical modem having a stable bi-directional connection with a corresponding coherent optical modem. The DSP frame can be compliant to G.709.3 Amendment 1 or OIF Implementation Agreement 400ZR or OpenZR+ MSA. The message can include any of a message payload, a counter, a version number, and an identifier. The message can include hardware details. The message can include I/Q tributary mapping information. The plurality of symbols can include any of N-Quadrature Amplitude Modulation (QAM) symbols, where N is an integer, and PCS-QAM with probabilistic constellation shaping, where the PCS has a fractional value, and hybrid N-QAM.

In another embodiment, a coherent optical modem includes circuitry configured to receive a message to send to a corresponding coherent optical modem, insert the message into a subset of a plurality of symbols that are part of a defined Digital Signal Processing (DSP) frame structure for coherent optical communication, wherein the subset of the plurality of symbols is a messaging channel included in the DSP frame structure, and cause transmission of the plurality of symbols to the corresponding coherent optical modem with the message included in the messaging channel.

The circuitry can be further configured to receive a plurality of symbols from the corresponding coherent optical modem, capture samples of the messaging channel, and determine a message in the messaging channel based on analysis of the samples. The messaging channel can include transmission in a robust manner utilizing any of the message is repeated on any of different polarizations, different DSP frames, and different symbols in a same DSP frame, and use of symbols in the messaging channel for any of parity, Cyclic Redundancy Check (CRC), and Forward Error Correction (FEC). The messaging channel is available prior to the coherent optical modem having a stable bi-directional connection with a corresponding coherent optical modem.

The DSP frame can be compliant to G.709.3 Amendment 1 or OIF Implementation Agreement 400ZR or OpenZR+ MSA.

In a further embodiment, a method includes receiving a plurality of symbols that are part of a defined Digital Signal Processing (DSP) frame structure for coherent optical communication, wherein the DSP frame has a messaging channel included therein that includes a subset of the plurality of symbols; capturing samples of the messaging channel; and determining a message in the messaging channel based on analysis of the samples.

The method can include transmitting, in the messaging channel, a reply to the message in a robust manner. The robust manner can include any of the reply is repeated on any of different polarizations, different DSP frames, and different symbols in a same DSP frame, and use of symbols in the messaging channel for any of parity, Cyclic Redundancy Check (CRC), and Forward Error Correction (FEC). The determining includes extraction and interpretation performed prior to Forward Error Correction (FEC) decoding on the data path. The messaging channel is available prior to a coherent optical modem having a stable bi-directional connection with a corresponding coherent optical modem.

The DSP frame can be compliant to G.709.3 Amendment 1 or OIF Implementation Agreement 400ZR. The message can include any of a message payload, a counter, a version, and an Organizationally Unique Identifier. The message can include hardware details. The message can include I/Q tributary mapping information. The plurality of symbols can include any of N-Quadrature Amplitude Modulation (QAM) symbols, where N is an integer, PCS-QAM with probabilistic constellation shaping, where the PCS has a fractional value, and hybrid N-QAM.

Also, the present disclosure relates to systems and methods for Precision Time Protocol (PTP) using a coherent Digital Signal Processor (DSP) frame. A DSP frame is a time based structure, delineated with periodic training and pilot symbols. The present disclosure presents a solution to run PTP (time transfer) over such optical coherent interfaces, using the DSP training symbols as a point of reference for a PTP timestamp. This provides a solution for timing transfer over coherent modems, such as 400ZR, G.709.3 (FlexO), and the like. This can be referred to as PTP over DSP. The objective of the systems and methods is to mitigate and minimize delay uncertainty and jitter in timing transfer between coherent optical interfaces.

In an embodiment, a coherent optical modem includes an optical interface; and circuitry connected to the optical interface and configured to detect a first timing reference point in a transmit Digital Signal Processor (DSP) frame in a transmit direction from a first node to a second node, and detect a second timing reference point in a receive DSP frame in a receive direction from the second node to the first node, wherein the first timing reference point and the second timing reference point are determined based on a pattern in any DSP frame field including i) a padding area, ii) a reserved area, and iii) a DSP Multi-Frame Alignment Signal (MFAS) area. A time difference between the first node and the second node is determined based in part on the first timing reference point and the second timing reference point and corresponding timing reference points from the second node.

The pattern can be input in select DSP frames for a time period between timing reference points that is greater than a time period for each DSP frame. The pattern can include a plurality of bits. The pattern can include a fixed value. The pattern can include a Pseudorandom Binary Sequence (PRBS). Timing information from the second node can be provided to the first node via a synchronization messaging channel. The coherent optical module can utilize a Flexible Optical Transport Network (FlexO) or an OpenROADM interface. The coherent optical module can utilize a ZR or an OpenZR+ interface. The DSP frame can be compliant to G.709.3 Amendment 1 or OIF Implementation Agreement 400ZR.

In another embodiment, a method IS implemented in a first node including a coherent optical modem in communication with a corresponding coherent optical modem in a second node. The method includes receiving a departure time, $T_{D-A}$, from the second node, wherein the departure time, $T_{D-A}$, is determined by the second node based on detecting a timing reference point in a Digital Signal Processor (DSP) frame; determining an arrival time, $T_{A-B}$, based on detecting the timing reference point in the DSP frame; and determining a time difference between the first node and the second node based in part on the departure time, $T_{D-A}$, and the arrival time, $T_{A-B}$. The timing reference point is determined based on a pattern in any DSP frame field including i) a padding area, ii) a reserved area, and iii) a DSP Multi-Frame Alignment Signal (MFAS) area.

The pattern can be input in select DSP frames for a time period between timing reference points that is greater than a time period for each DSP frame. The pattern can include a plurality of bits. The pattern can include a fixed value. The pattern can include a Pseudorandom Binary Sequence (PRBS). Timing information from the second node can be provided to the first node via a synchronization messaging channel. The coherent optical module can utilize a Flexible Optical Transport Network (FlexO) or an OpenROADM interface. The coherent optical module can utilize a ZR or an OpenZR+ interface. The DSP frame can be compliant to G.709.3 Amendment 1 or OIF Implementation Agreement 400ZR.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is FIG. 15.1 from G.709.3N.1331.3 Amendment 1 (11/18).

FIG. 5 is a block diagram of a DSP frame, namely FIG. 34 of OIF-400ZR-01.0 Implementation Agreement.

DETAILED DESCRIPTION OF THE DISCLOSURE

Again, the present disclosure relates to systems and methods for a messaging channel in a coherent optical Digital Signal Processing (DSP) frame. The messaging channel is a communications channel, signaling channel, etc. Traditionally, such communications channels take place at the protocol layer, post Forward Error Correction (FEC) after there is a stable bi-directional connection. The present disclosure defines the messaging channel (i.e., communications channel) pre-FEC at a DSP symbol level, within a Physical Media Attachment (PMA) sublayer. The messaging channel includes various approaches for robustness across an otherwise unprotected (FEC) set of bits. The degree of robustness can be traded off against computational complexity and detection latency, according to system requirements—in a way that is not possible with existing PCS overhead channels. The messaging channel can be used for a variety of functions including advertising module information, assisting in DSP signal acquisition, polarization X/Y/I/Q tributary mappings, clock recovery settings, bandwidth, and the like. This could be used to speed up frame acquisition.

Also, the present disclosure presents a solution to run PTP (time transfer) over such optical coherent interfaces, using the DSP training symbols as a point of reference for a PTP timestamp. This provides a solution for timing transfer over coherent modems, such as 400ZR, G.709.3 (FlexO), and the like. This can be referred to as PTP over DSP. The objective of the systems and methods is to mitigate and minimize delay uncertainty and jitter in timing transfer between coherent optical interfaces.

Network

Figure 1:
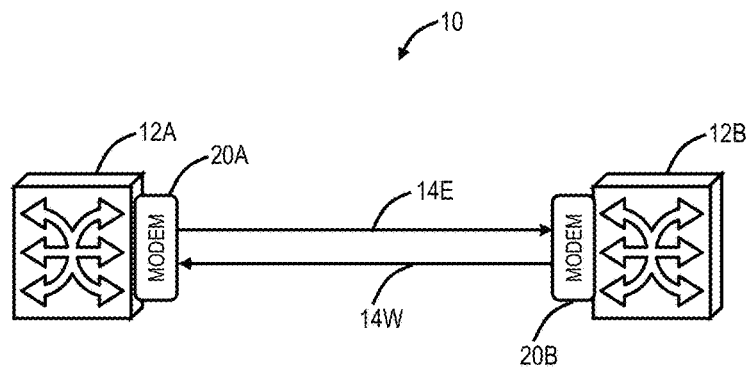
FIG. 1 is a network diagram of an optical network 10 between two nodes.

FIG. 1 is a network diagram of an optical network 10 between two nodes 12A, 12B. The nodes 12A, 12B are interconnected by links 14E, 14W providing bidirectional communication. The links 14E, 14W are optical fibers and the nodes 12A, 12B can be network elements, and the nodes 12A, 12B can each include a coherent optical modem 20A, 20B. The nodes 12A, 12B can be switches, routers, Wavelength Division Multiplexing (WDM) terminals, Reconfigurable Optical Add/Drop Multiplexers (ROADMs), routers, switches, and the like. That is, practically any type of network element or device can use coherent optical modems 20A, 20B. The coherent optical modems 20A, 20B are connected to one another via the links 14E, 14W and can include optical transceivers, transponders, transmitters/receivers, etc. The coherent optical modems 20A, 20B can be pluggable modules such as defined by various Multisource Agreements (MSAs), e.g., QSFP variants, CFP variants, etc. The coherent optical modems 20A, 20B can also be 400ZR, G.709.3, and the like. The coherent optical modems 20A, 20B can support OTN (FlexO), Ethernet, and the like.

Note, the optical network 10 is presented for illustration purposes to describe the messaging channel methods. Practical embodiments contemplate additional nodes in various interconnection architectures. Also, note, the terms nodes, network elements, network devices can be used interchangeably herein. The present disclosure contemplates use of the coherent optical modems 20A, 20B with a DSP frame in any device.

Coherent Modem Functionality

The modems 20A, 20B are coherent optical modems with Digital Signal Processing (DSP) therein. The modems 20A, 20B can support programmable modulation, or constellations with both varying phase and/or amplitude. The modems 20A, 20B can support multiple coherent modulation formats such as, for example, i) Dual-Polarization (DP) Binary Phase-Shift Keying (BPSK), ii) DP Quadrature Phase-Shift Keying (QPSK), iii) DP 16-Quadrature Amplitude Modulation (QAM), iv) DP 16QAM, iv) DP 64QAM, and the like. With associated DSP blocks in the modem 20A, 20B hardware, moving from modulation formats can be software-programmable. Also, the modems 20A, 20B can support dual-polarization, such as Polarization Multiplexing (X/Y or Horizontal/Vertical). Additionally, the modems 20A, 20B can support various aspects of nonlinear effect mitigation and dispersion compensation (both for chromatic and polarization mode) in the electrical domain, thus eliminating external dispersion compensation devices, filters, etc. Modems can also adapt the FEC coding that is used, as another method to tradeoff service rate vs. noise tolerance.

Figure 2:
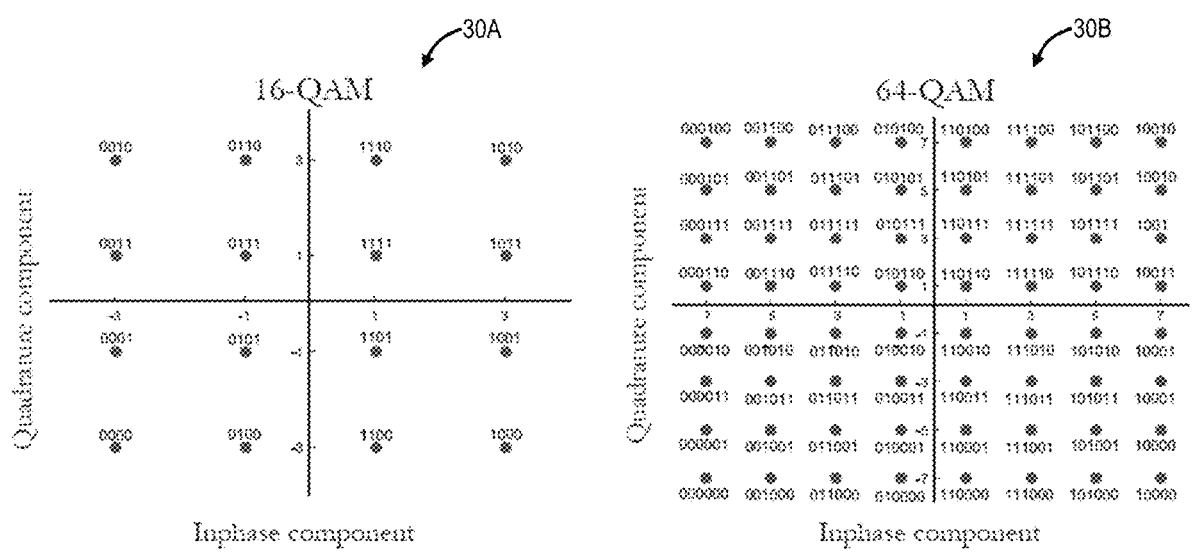
FIG. 2 is a graph illustrating DSP symbols for 16-QAM and 64-QAM (Quadrature Amplitude Modulation (QAM)).

FIG. 2 is a graph illustrating DSP symbols 30A, 30B for examples of 16-QAM and 64-QAM. Note, the DSP frame is defined in terms of symbols. Note, the graph includes an in-phase (I) component and quadrature (Q) component. Also, with polarization multiplexing, there is a graph for each polarization, i.e., X/Y each having 1:Q components. In 16-QAM, there are 16 possible symbols each representing 4-bits. In 64-QAM, there are 64 possible symbols each representing 6-bits. Of course, 16-QAM and 64-QAM are merely two examples and there can be others, e.g., 4-QAM, 8-QAM, 128-QAM, etc.

DSP Frame

Figure 3:
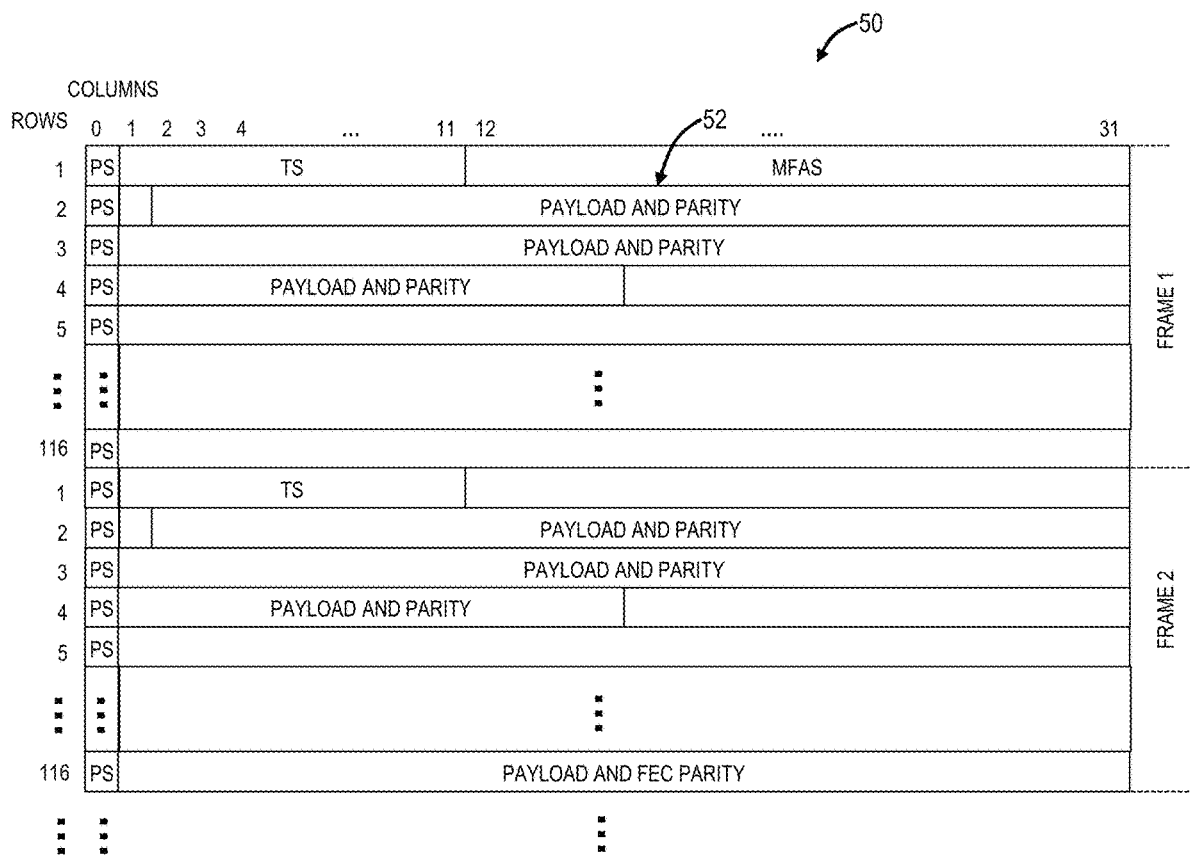
FIG. 3 is a block diagram of a DSP frame, namely
Figure 4:
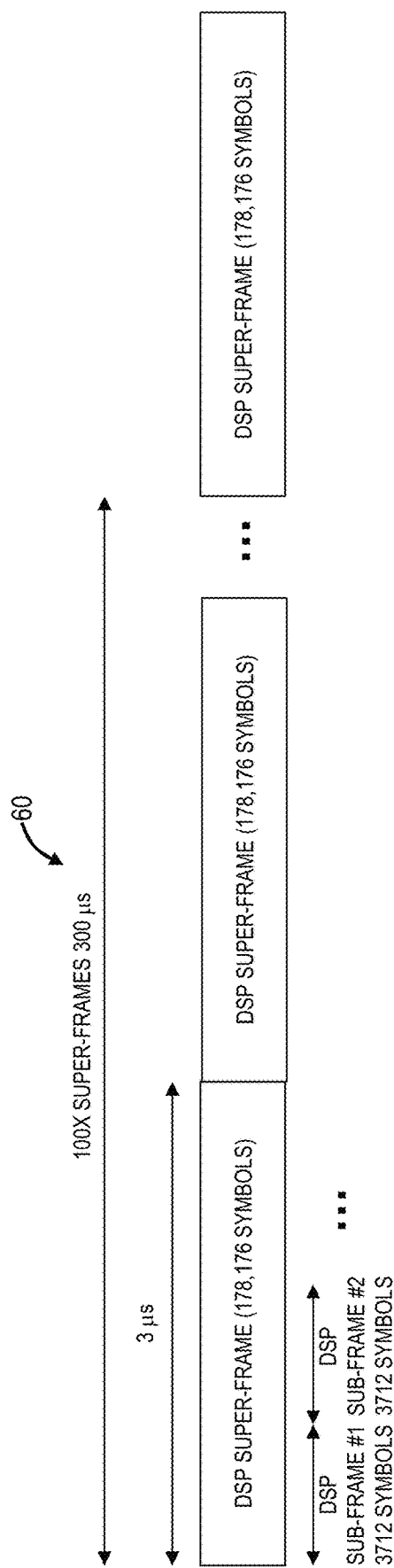
FIG. 4 is a block diagram of DSP super-frames, namely from FIG. 25 of the OpenROADM MSA 3.01.

FIG. 3 is a block diagram of a DSP frame 50, and FIG. 4 is a block diagram of DSP super-frames 60. As described herein, a DSP frame is a structure of symbols that is used to organize the modulated/demodulated data in a transmitter and receiver, i.e., a coherent optical modem 20. The present disclosure utilizes the term "DSP frame" because it is the data sent to the transmitter and received from the receiver, and the data includes symbols (each symbol represents bits). The DSP frame has been standardized, for example, in FIG. 15.1 from G.709.3/Y.1331.3 Amendment 1 (11/18) as well as in FIG. 8 of the OIF 400ZR IA 1.0. Of course, other embodiments of a DSP frame are also contemplated including proprietary implementations and future standardized versions, all of which are contemplated herewith. Generally, the DSP frame includes symbols for training and pilot, padding/reserved sections, data payload, etc. A key aspect of the DSP frame is it is processed pre-FEC so there is no conventional defined messaging channel therein.

FIG. 3 is FIG. 15.1 from G.709.3/Y.1331.3 Amendment 1 (11/18) and includes various payload and parity 52 fields, which can include padding symbols. FIG. 4 utilizes a DSP super-frame 60 from FIG. 25 of the OpenROADM MSA 3.01 and includes 74 additional symbols are reserved for future use/innovation.

Figure 5:
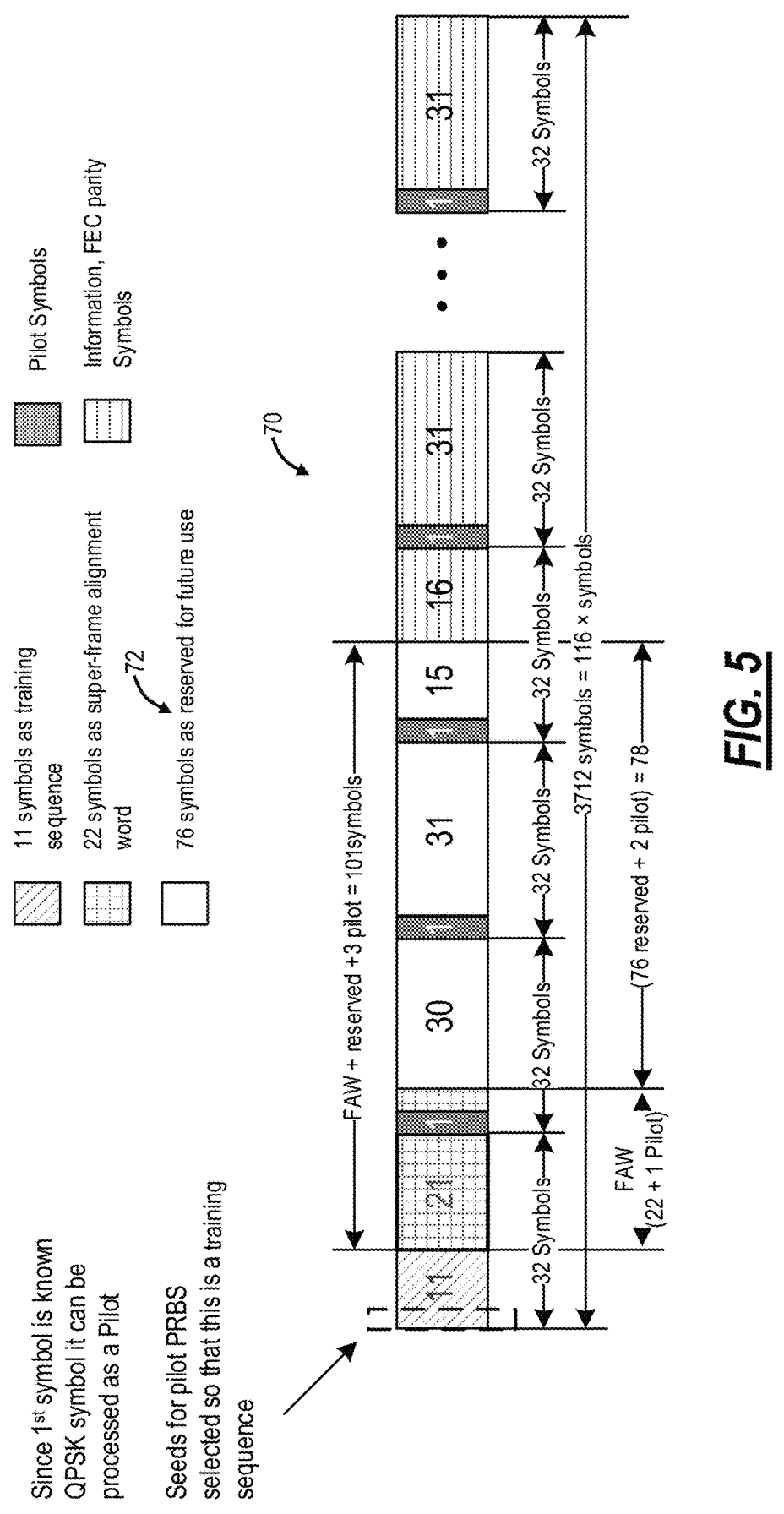

FIG. 5 is a block diagram of a DSP frame 70, namely FIG. 34 of OIF-400ZR-01.0 Implementation Agreement. The DSP frame 70 includes 11 symbols for a training sequence, 22 symbols as a super-frame alignment word, 76 symbols reserved for future use (reserved symbols 72), pilot symbols, and information, FEC parity symbols. With regard to the reserved symbols, the OIF-400ZR-1.0 Implementation Agreement (section 12.1) states solely: 76 symbols are reserved to be used for future proofing and for innovation. These symbols should be randomized to avoid strong tones. These symbols should be selected from 16-QAM modulation.

DSP Frame Messaging Channel

The present disclosure describes a new signaling and messaging mechanism directly between the digital modulator and demodulator blocks in a communications system, i.e., the coherent modems 20. It can be used to communicate low-bandwidth control information (as distinct from the much higher volume payload data) from one end of a link to the other. It does so by incorporating this side information directly into the DSP frame structure—at the physical symbol level—the baseline of which has been defined in various (coherent optical) communications systems.

The present disclosure contemplates any of the aforementioned DSP frames 50, 60, 70, and future ones as well. In an embodiment, the present disclosure utilizes the so-called reserved symbols or padding symbols for the messaging channel. Of course, the DSP frame specifications can also specify specific symbols for the messaging channel as well. That is, the present disclosure is not limited only to undefined symbols.

The padding symbols and the reserved symbols 72 exist due to a slight mismatch between the size of the data payload and the dimensions of the physical frame; effectively they are padding to make up the relatively small difference. As currently standardized in 400ZR, the Reserved symbols represent a "wasted" (un-utilized) overhead of:

(76 symbols per polarization)/(3712 symbols/sub-frame)/(49 sub-frames per superframe)=~0.04% of the available communication bandwidth A similar calculation can be made for OpenROADM, OpenZR+, etc. which have slightly different ratios due to the different FEC schemes and frame dimensions employed.

The messaging channel is defined in terms of symbols in the DSP frames 50, 60, 70 by carefully selecting the symbol values and making them appear random so that all desirable properties are preserved. Examples for making them appear random include line encoding (e.g., 8b/10b), scrambling, etc. By careful design, it is possible to ensure that no degradation in performance is introduced during inter-operation with modems 20 that have not implemented the messaging channel (e.g., those from other vendors, until standardized). That is, one coherent modem 20A can implement the messaging channel while the other coherent modem 20B does not, and still inter-operate normally; of course without the messaging channel.

Also, it is not necessary to use all reserved symbols 72 or padding symbols for the messaging channel. In an embodiment, it is possible to use the last reserved symbols 70, starting at the right side in FIG. 5. This is done to reduce the likelihood of conflict with other future standard functions (e.g., multiframe (MF), Precision Timing Protocol (PTP) over DSP, . . . ) that might use some of these symbols and which are likely to be introduced starting from the left.

The present disclosure also lends itself to be adapted into any new DSP frame structure, such as the 1.5% overhead one discussed in 800ZR. Thus, the messaging channel can be applied to 800ZR/FlexO-x/xe interfaces and beyond.

In general, each dual-polarization QAM symbol can convey different amounts of information according to the "modulation order," e.g., 4 bits (QPSK), 6 bits (8-QAM) or 8 bits (16-QAM). Even more generally, when probabilistic constellation shaping or hybrid QAM schemes are used (this is not true for 400ZR), the number of bits carried per symbol can also be a fractional value (e.g., 5.3 bits per symbol).

DSP Frame Messaging Channel Applications

This messaging channel can be used by DSP engines to optimize the physical link before the FEC has started decoding and the protocol layer is up and running. Here are a few non-limiting and non-exhaustive examples of what such a signaling and messaging scheme can enable:

1) Advertise on the transmitter that this is a specific manufacturer (or other unique manufacturer identifier). This can be detected by receivers to understand the interoperability. For example, bookended receivers (i.e., coherent modems 20 from the same vendor) could enable other optimizations (including those that go beyond or technically violate the standard) for book-ended applications.
2) Could be used to signal variants within the same vendor's implementations, such as different lasers, different hardware versions (e.g., Tx drivers) that have different capabilities.
3) Could be used to detect permutations of Tx I/Q tributary mappings (Ref. 400ZR IA 1.0, section 12.4 "Channel mapping").
4) Can be used in a bidirectional link for one end to communicate the XN:I/Q tributary mappings detected by a receiver, and can be used in an algorithm to enable swapping on a transmitter (in absence of swapping capability on a receiver).
5) DSP transmit/receive (T/R) loop optimizations for settings like transmitter pre-compensation and spectral shaping.
6) Master/slave timing/clocking loop modes (to reduce clock jitter experienced on the received symbols).
7) Topology and connection monitoring.

Example DSP Frame Messaging Channel

In an embodiment, some symbols of the DSP padding symbols or reserved symbols 72 are used to define a messaging channel as follows. Different formats are also contemplated.

Use 80-bit messaging format, which would translate to 20×QPSK symbols or 10×16QAM symbols. These bits are raw and must be protected against bit errors and must be DC balanced. It is proposed that the 8b10b coding scheme be used to translate an 8-byte message (shown below) to these 80 Reserved bits.

The message format would be as shown below.

| MSG – 32-bits | CTR – 4-bits | VER – 4-bits | OUI – 24-bits |

One could choose to only use the OUI (Organizationally Unique Identifier) portion of the message to advertise manufacturer only. As well, one could choose to grow the messaging field, and this can be controlled by the version (VER) field.

OUI—Ethernet Organizationally Unique Identifier for the modem manufacturer, as per standards-oui.ieee.org/oui/oui.txt. It is easier to use existing forums for such unique identifiers than to define and manage a new set.

VER—Version field to identify protocol used in the messaging field. For example, 0x0 reserved to signal it is advertising for a bookended configuration only, message blank, and 0xF reserved to signal backwards defect (unable to decode the message being received from the far end).

CTR—Counter used for slow-protocol handshaking, increments every time a new message is posted.

MSG—4-byte message.

Again, this is just an example format and any type of format is contemplated herewith.

Receiver Process

A receiver process could be as follows:

Firmware captures multiple frame samples of the final symbols in the Reserved field that correspond to 80 bits. These frame samples are not necessarily consecutive, i.e., they could be more than one frame apart.

Validate messages with voting across multiple samples, then 8b10b decoding. This accounts for the pre-FEC operation. The voting includes taking multiple samples, such as from different polarizations, different DSP frames, different symbols within the same DSP frame, etc. Other schemes for validating messages are also contemplated such as using parity, Cyclic Redundancy Check (CRC), FEC such as low complexity schemes, and the like.

If no Coding violation for 8b10b, decode the OUI to identify manufacturer

If VER=0, the Tx only broadcasts.

If VER=0xF, there is a backwards failure, no handshaking possible.

Else decode message based on VER.

Check for new CTR increment (new message).

When new message received and decoded, increment CTR with new Tx message. Add a timeout (e.g., 1 s) to send a new message and increment CTR.

The scheme employs a combination of tricks in the pre-processing and post-processing to enable robustness across an otherwise unprotected (FEC) set of bits. Again, the degree of robustness can be traded off against computational complexity and detection latency, according to system requirements—in a way that is not possible with existing PCS overhead channels.

Circuit and Process

Figure 6:
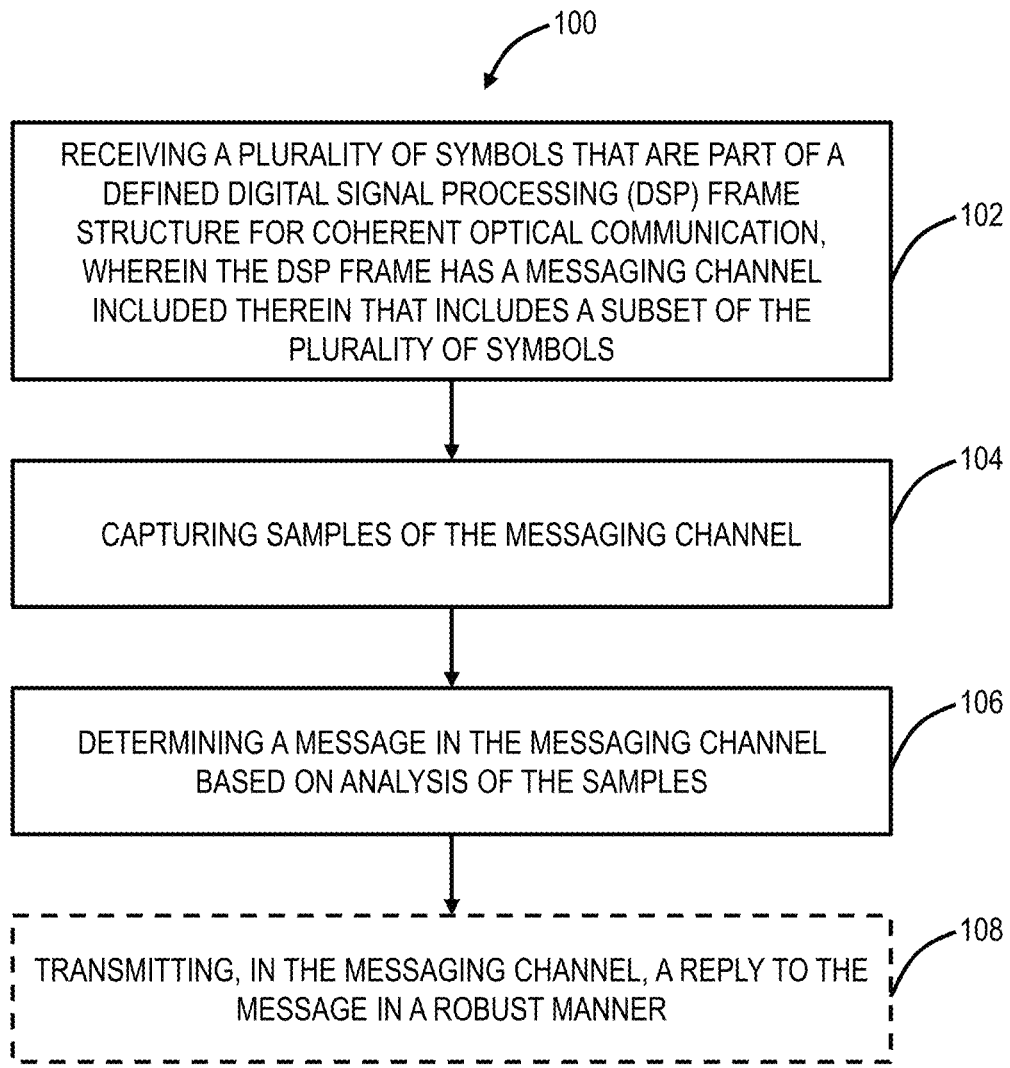
FIG. 6 is a flowchart of a process for implementing a messaging channel within a DSP frame, from a perspective of a receiving coherent optical modem.

FIG. 6 is a flowchart of a process 100 for implementing a messaging channel in a DSP frame. The process 100 can be implemented in a Digital Signal Processor (DSP), Application Specific Integrated Circuit (ASIC), etc. The process 100 can be implemented in one of the coherent modems 20A, 20B (or both).

The process 100 includes receiving a plurality of symbols that are part of a defined Digital Signal Processing (DSP) frame structure for coherent optical communication, wherein the DSP frame structure has a messaging channel included therein that includes a subset of the plurality of symbols (step 102); capturing multiple samples of the messaging channel (step 104); and determining a message in the messaging channel based on analysis of the multiple samples (step 106). The process 100 can also include transmitting, in the messaging channel, a reply to the message in a robust manner (step 108). The robust manner includes any of the reply is repeated on any of different polarizations, different DSP frames, and different symbols in a same DSP frame, and use of symbols in the messaging channel for any of parity, Cyclic Redundancy Check (CRC), and Forward Error Correction (FEC).

The analysis can be performed prior to Forward Error Correction (FEC) decoding on the data path. The messaging channel can be available prior to a coherent optical modem having a stable bi-directional connection with a corresponding coherent optical modem. The DSP frame can be compliant to G.709.3 Amendment 1 or OIF Implementation Agreement 400ZR. The message can include any of a message payload, a counter, a version, and an Organizationally Unique Identifier. The message can include hardware details, tributary mapping information, and the like. The plurality of symbols can include any of N-Quadrature Amplitude Modulation (QAM) symbols, where N is an integer, and PCS-QAM with probabilistic constellation shaping, where the PCS has a fractional value.

Figure 7:
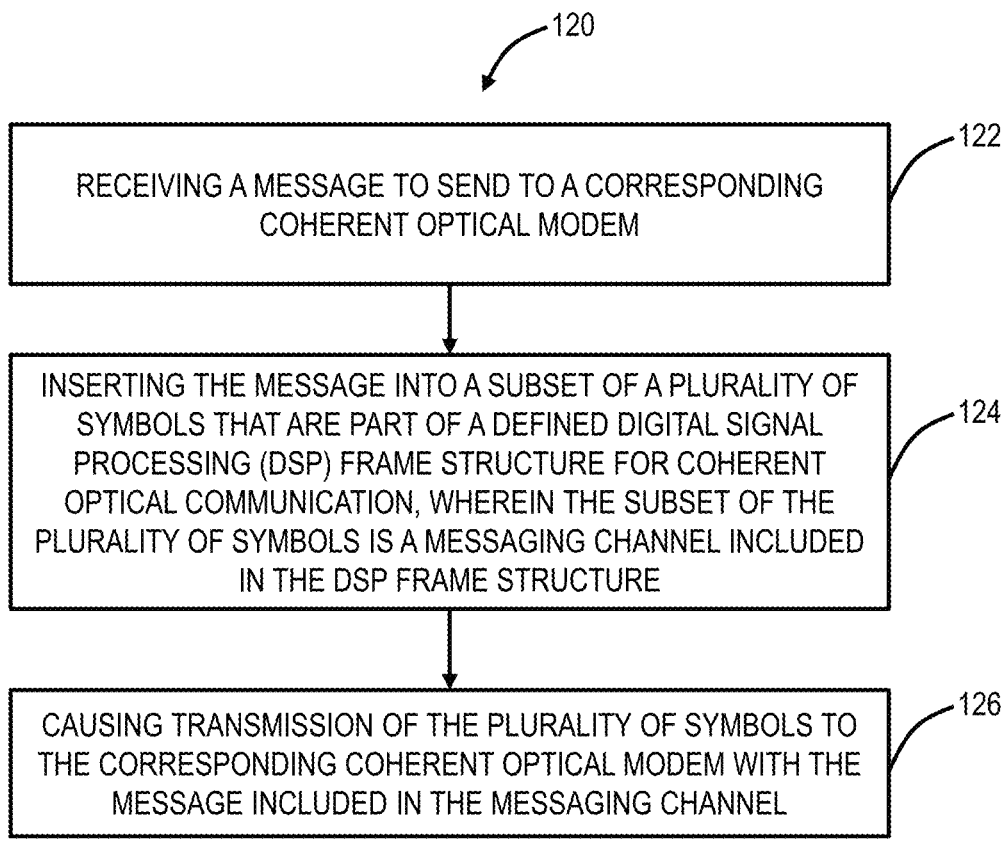
FIG. 7 is flowchart of another process for implementing a messaging channel in a DSP frame, from a perspective of a transmitting coherent optical modem.

FIG. 7 is flowchart of another process 120 for implementing a messaging channel in a DSP frame. For example, the process 100 focuses on the perspective of a receiving coherent optical modem whereas the process 120 focuses on the perspective of a transmitting coherent optical modem. The process 120 can be implemented in a Digital Signal Processor (DSP), Application Specific Integrated Circuit (ASIC), etc. The process 120 can be implemented in one of the coherent modems 20A, 20B (or both).

The process 120 includes receiving a message to send to a corresponding coherent optical modem (step 122), inserting the message into a subset of a plurality of symbols that are part of a defined Digital Signal Processing (DSP) frame structure for coherent optical communication, wherein the subset of the plurality of symbols is a messaging channel included in the DSP frame structure (step 124), and causing transmission of the plurality of symbols to the corresponding coherent optical modem with the message included in the messaging channel (step 126).

The process 120 can also include receiving a plurality of symbols from the corresponding coherent optical modem, capturing samples of the messaging channel, and determining a message in the messaging channel based on analysis of the samples. The messaging channel can include transmission in a robust manner utilizing any of the message is repeated on any of different polarizations, different DSP frames, and different symbols in a same DSP frame, and use of symbols in the messaging channel for any of parity, Cyclic Redundancy Check (CRC), and Forward Error Correction (FEC). The messaging channel is available prior to the coherent optical modem having a stable bi-directional connection with a corresponding coherent optical modem. The DSP frame can be compliant to G.709.3 Amendment 1 or OIF Implementation Agreement 400ZR or OpenZR+ MSA.

Coherent Modem Functionality—PTP

Figure 8:
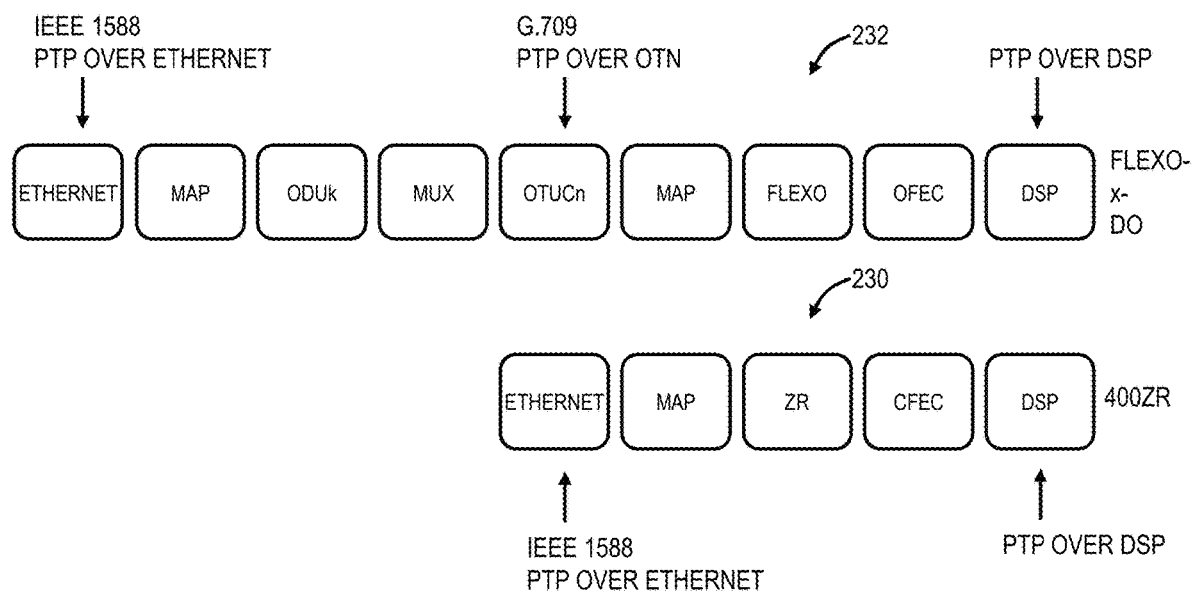
FIG. 8 is a block diagram of functional blocks for an Ethernet (ZR) and OTN (FlexO) coherent interface.

FIG. 8 is a block diagram of functional blocks for an Ethernet (ZR) 230 and OTN (FlexO) 232 coherent interface. The ZR 320 and the FlexO 232 coherent interfaces can be realized in the coherent optical modems 20. As described herein, the ZR 230 interface can be compliant to OIF-400ZR-01.0 or other ZR-related MSAs, such as OpenZR+ and future 800ZR/800LR. OpenZR+ is described in the OpenZR+ Specifications, version 1.0, 4 Sep. 2020, the contents of which are incorporated by reference.

The FlexO 232 interface can be compliant to G.709.3 and the like, i.e., a FlexO-x-DO, which is a FlexO interface signal of order x with strong OFEC implementation. FIG. 2 illustrates functional blocks that include framing and other data manipulation and can be implemented in circuitry.

The ZR 230 interface includes an Ethernet block, a mapping block, a ZR block, a Concatenated FEC (CFEC) block, and a DSP block. These blocks start with the Ethernet block, which interfaces an Ethernet signal, and ends after the DSP block, which provides a signal for optical transmission. The FlexO 232 interface includes an Ethernet block, a mapping block, an Optical Data Unit level k (ODUk) block, a multiplexing block, an Optical Transport Unit C level n (OTUCn) block, a mapping block, a FlexO block, an Open FEC (OFEC) block, and a DSP block. Similar to the ZR 230, the FlexO 232 interface starts with the Ethernet block and maps to a FlexO signal. Note, some implementations may not include all of the mapping or multiplexing blocks. Also, the various functional blocks, while illustrated separately, can be realized in integrated hardware. Note, the modems 20A, 20B can include various additional functionality, which is omitted for illustration purposes.

Conventional IEEE 1588 PTP over Ethernet is performed at the Ethernet block. For the FlexO 232 interface, conventional G.709 PTP over OTN is performed at the OTU block. The problem with PTP over Ethernet and PTP over OTN is there are non-deterministic delays in the FEC and DSP blocks, i.e., delay uncertainty.

The OFEC block is configured to receive a FlexO signal and encode the OTN signal with Soft Decision (SD) FEC (SD-FEC) and to perform SD-FEC decoding to provide an error-corrected signal to the FlexO block. U.S. Pat. No. 9,432,144 describes PTP in the FEC layer to account for the delay uncertainty at the FEC layer. Also, OFEC is described in the Open ROADM MSA 3.01 W-Port Digital Specification, Jul. 25, 2019, the contents of which are incorporated by reference.

PTP Over DSP

The DSP and FEC blocks introduce variable delay, such as at start-up, after a fault recovery, etc., and this underterministic delay adds timing uncertainty. To address and compensate for this timing uncertainty, the present disclosure includes using a significant instant, i.e., timing reference point, in the DSP layer. This timing reference point is a first point seen at a receive side and a last point seen at a transmit side and is not affected by any delays in the FEC block or the DSP block.

The present disclosure involves using fixed DSP symbols (sequences) as the timing reference point. The reference point must be reliably detected at given intervals. The time of detection is triggered by the timing reference point or "significant instant." This reference point using the fixed DSP symbol is post FEC processing in the transmit direction and pre FEC processing in the receive direction to minimize the uncertainty and jitter introduced by such blocks. The timing reference point is used to indicate an Arrival Time ($T_a$ using Rx frame boundaries) and Departure Time ($T_d$ using Tx frame boundaries).

The period between the timing reference points must allow for the transfer of the timing information via a synchronization (sync) message channel. That is, there is a requirement to exchange the timing reference points from one node 12A to the other node 12B. The exchange of the timing information can be via PTP sync messages. The sync messaging channel can use the existing protocol layers (e.g., OTN Synchronization Message Channel (OSMC) in OTN, Ethernet Synchronization Message Channel (ESMC) in Ethernet, a Data Communication Network (DCN), an Optical Service Channel (OSC), etc.).

A DSP frame 50 has a fast period that is too fast to convey timing (i.e., ~3 ms). The present disclosure creates a timestamp event that is a multiple of DSP frames, using the unused DSP frame padding. FIG. 3 is FIG. 15.1 from G.709.3/Y.1331.3 Amendment 1 (11/18) and includes a 76 Z-bit padding field (PAD) in frame 1, row 2 columns 3 to 32, row 3 columns 2 to 32 and row 4 columns 2 to 16. The PAD can also be called reserved (RES) in OpenROADM. FIG. 4 utilizes a DSP super-frame 60 from FIG. 25 of the OpenROADM MSA 3.01 and includes 74 additional symbols are reserved for future use/innovation.

For a timestamp point of reference, alternating fixed patterns (appropriately balanced with 0s and 1s) can be inserted in this PAD or RES area, and when a new pattern is detected, the timestamp (TS) (or alternatively any known location in the frame such as the start of padding location) of the current frame is identified as a timestamp point of reference. Alternatively, alternating Pseudorandom Binary Sequence (PRBS) patterns can be used in the padding area to signal events when the pattern is changing.

These padding (or reserved) fields are processed pre-FEC and must work under large Bit Error Rate (BER) rates, hence a multi-bit pattern is desired for such operation (i.e., it is not possible to use a single bit). The use of multiple bits is such that it is possible to match the pattern with high BER rates. That is, it may not be necessary to perform an exact match, but rather a match of a portion of the bits in the pattern. For example, the threshold of matching the pattern can be based on the bit error rate.

Time Transfer Process

Figure 9:
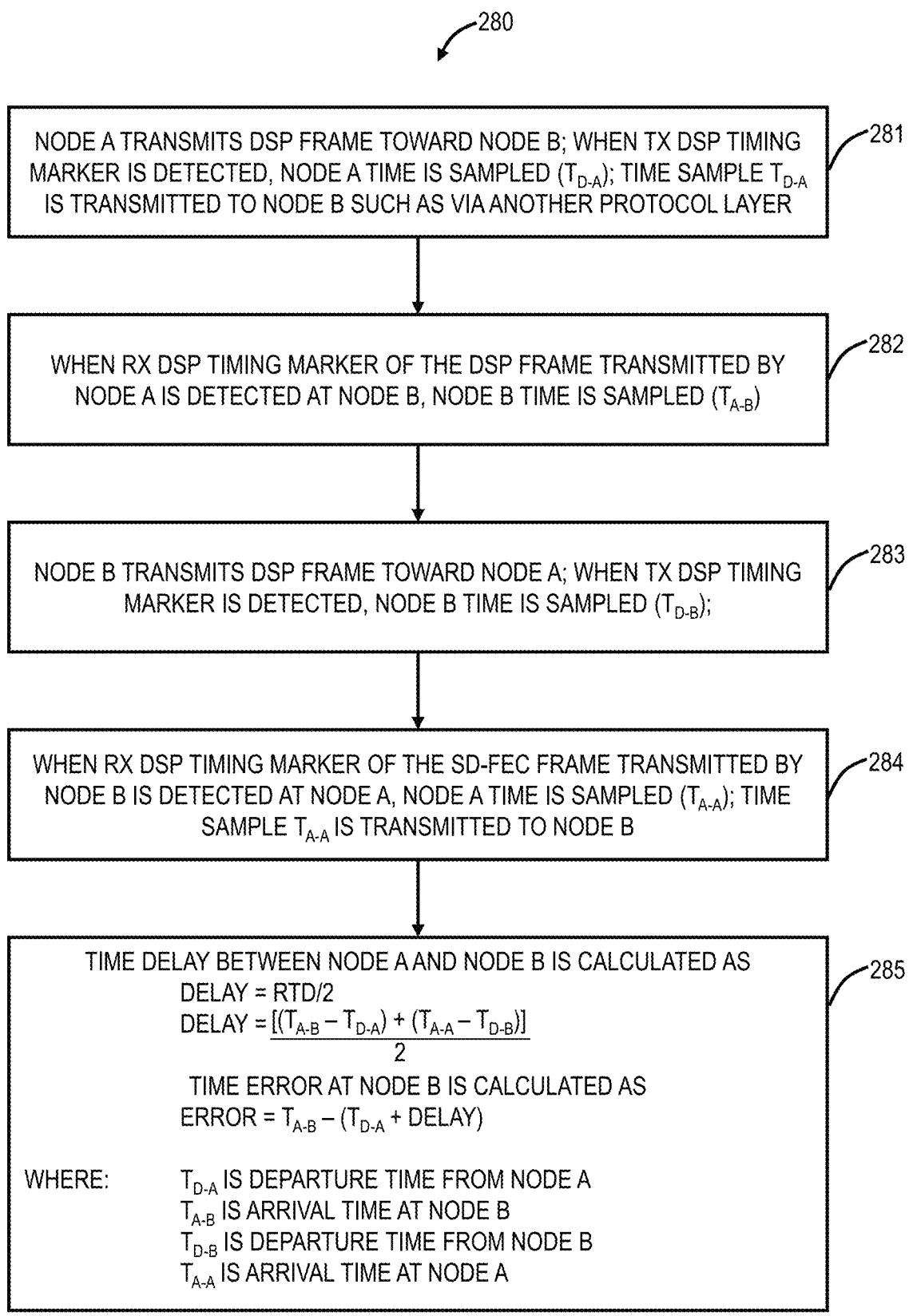
FIG. 9 is a flowchart of a time transfer process implemented between the nodes via the coherent optical modems.

FIG. 9 is a flowchart of a time transfer process 280 implemented between the nodes 12A, 12B via the coherent optical modems 20A, 20B. The time transfer process 280 contemplates operation through the nodes 12A, 12B, the modems 20A, 20B, etc. In some embodiments, more or fewer steps could be included in the precision time transfer process 280. A key aspect of the time transfer process 280 is to convey timing references between the nodes 12A, 12B via markers in the DSP frame, before any FEC decoding and after any FEC encoding, and independent of any delay in the DSP framing process. That is, the time transfer process 280 defines a timing reference point at the DSP frame (previously only defined for higher layer protocols such as the Ethernet layer and the OTN layer) to minimize the effects of the FEC processing and/or adaptation on precision of the transferred timing information. In this manner, the conveyed timing references are not impacted by any delays associated with the adaptation processes, the FEC block, the DSP block, etc.

For illustration purposes, the time transfer process 280 is described with reference to the nodes 12A, 12B in the optical network 10. Here, the objective is to synchronize a clock for the node 12B with a clock of the node 12A. Also, with the appropriate time references captured, through the DSP frame, and transferred to the nodes 12A, 12B, time transfer between the nodes 12A, 12B can be achieved using well-known techniques in other protocols. That is, transferring the time references from the node 12A to the node 12B can be via a separate protocol layer, such as Ethernet packets, a Data Communication Network (DCN), an Optical Service Channel (OSC), OSMC, ESMC, etc.

The precision time transfer process 280 involves using a pattern in the DSP frame (as seen in the padding section of FIG. 3) as a reference for timestamp generation. The pattern can be at given intervals in the select DSP frames. The time of detection becomes the time reference point or "significant instant." Again, this reference point is post protocol mapping and FEC adaptation in the TX direction and pre protocol mapping and FEC processing in the RX direction to minimize the uncertainty and jitter introduced by the FEC processing, protocol mapping, DSP processing, etc.

The precision time transfer process 70 includes the node 12A transmitting a DSP frame towards the node 12B. When a TX DSP timing marker is detected, the node 12A time is sampled ($T_{D-A}$) and this time sample $T_{D-A}$ is transferred to the node 12B, such as via another protocol layer (step 281). When the RX DSP timing marker of the DSP frame transmitted by the node 12A is detected at the node 12B, the node 12B time is sampled ($T_{A-B}$) (step 282). The node 12B transmits a DSP frame towards the node 12A, and when the TX DSP timing marker is detected, the node 12B time is sampled ($T_{D-B}$) (step 283). When the RX DSP timing marker of the frame transmitted by the node 12B is detected at the node 12A, the node 12A time is sampled ($T_{A-A}$). This time sample $T_{A-A}$ is transferred to the node 12B such as via another protocol layer (step 284).

At this point, all four time samples are available at the node 12B. The time delay between the node 12A and the node 12B can be calculated as, assuming the time delays between the nodes 12A, 12B in both directions are symmetric:

$$\text{Round\_Trip\_Delay} = [(T_{A-B} - T_{D-A}) + (T_{A-A} - T_{D-B})]$$

$$\text{Delay} = \frac{\text{Round\_Trip\_Delay}}{2}$$

where: $T_{D-A}$ is departure time from the node 12A, $T_{A-B}$ is arrival time at the node 12B, $T_{D-B}$ is departure time from the node 12B, and $T_{A-A}$ is arrival time at the node 12A (step 285).

The time error at the node 12B can be calculated as:

$$\text{Error} = T_{A-B} - (T_{D-A} + \text{Delay})$$

The clock at the node 12B can be adjusted by the Error thereby synchronizing with the clock at the node 12A. Control algorithms can then be employed to minimize the time error.

Figure 10:
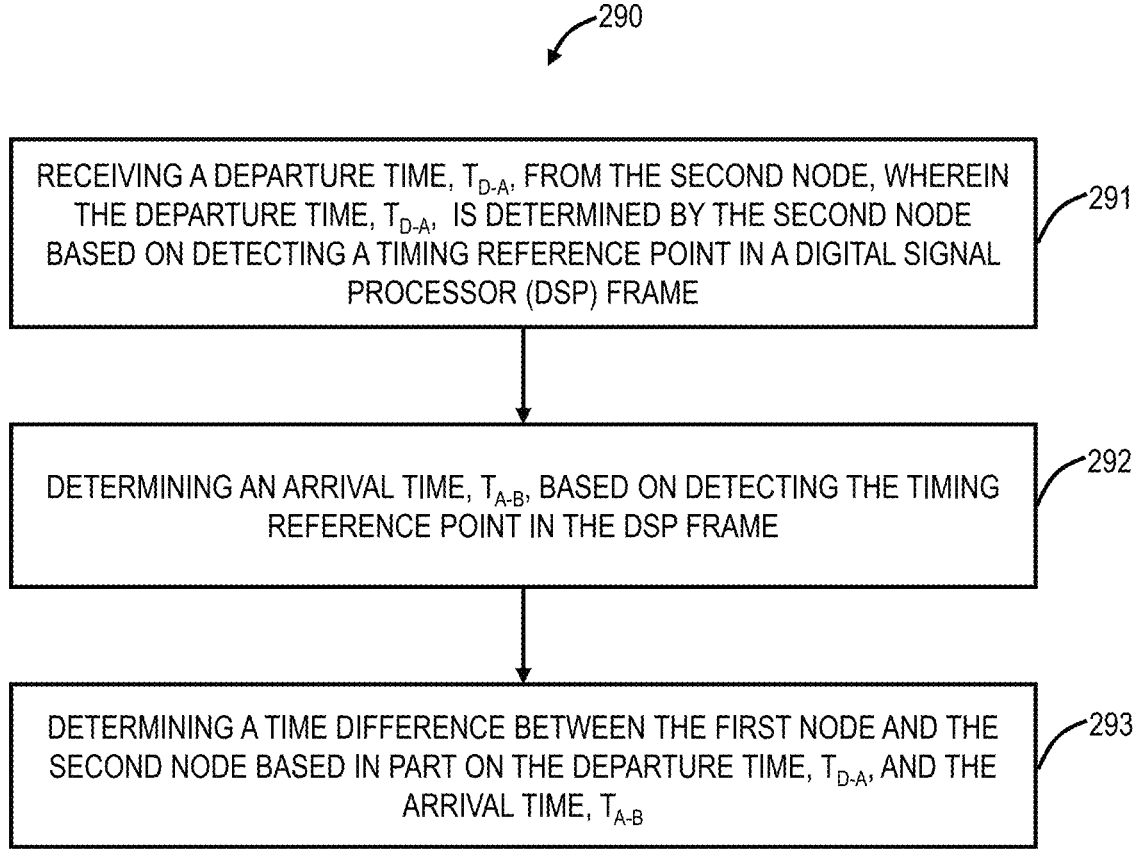
FIG. 10 is a flowchart of a process implemented by a coherent optical modem

FIG. 10 is a flowchart of a process 290 implemented by a coherent optical modem. That is, the process 290 contemplates operation by one of the coherent optical modems 20A, 20B. The process 290 is implemented in a first node 12B including a coherent optical modem 20B in communication with a corresponding coherent optical modem 20A in a second node 12A.

The process 290 includes receiving a departure time, $T_{D-A}$, from the second node, wherein the departure time, $T_{D-A}$, is determined by the second node based on detecting a timing reference point in a Digital Signal Processor (DSP) frame (step 291); determining an arrival time, $T_{A-B}$, based on detecting the timing reference point in the DSP frame (step 292); and determining a time difference between the first node and the second node based in part on the departure time, $T_{D-A}$, and the arrival time, $T_{A-B}$ (step 293).

The coherent optical interface can include an optical interface and circuitry connected to the optical interface and configured to implement the process 290.

The timing reference point can be determined based on a pattern in the padding area or reserved area in the DSP frame. The timing reference point can be determined based on a pattern in any DSP frame field including i) a padding area, ii) a reserved area, and iii) a DSP Multi-Frame Alignment Signal (MFAS) area.

The pattern can be input in select DSP frames for a time period between timing reference points that is greater than a time period for each DSP frame. The pattern can include a plurality of bits. The pattern can include a fixed pattern. The pattern can include a Pseudorandom Binary Sequence (PRBS).

Timing information from the second node can be provided to the first node via a synchronization messaging channel. The coherent optical module can utilize a Flexible Optical Transport Network (FlexO) interface or a ZR interface. The DSP frame can be compliant to G.709.3 Amendment 1.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like;

Field-Programmable Gate Arrays (FPGAs), and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A coherent optical transmitter comprising circuitry configured to:
   obtain information for a message to be transmitted to an adjacent coherent optical receiver,
   modulate the information on a plurality of symbols that are part of a defined Digital Signal Processing (DSP) frame structure, and
   cause transmission, to the adjacent coherent optical receiver, of the DSP frame with the information modulated on the plurality of symbols, wherein the transmission includes repeating the information for reception at the adjacent coherent optical receiver prior to Forward Error Correction decoding in a data path.

2. The coherent optical transmitter of claim 1, wherein the plurality of symbols are one or more of reserved symbols, padding symbols, and undefined symbols in the DSP frame structure.

3. The coherent optical transmitter of claim 1, wherein the repeating is via one or more of different polarizations, different DSP frames, and different symbols in a same DSP frame.

4. The coherent optical transmitter of claim 1, wherein the transmission further includes utilizing any of parity and Cyclic Redundancy Check (CRC) for the plurality of symbols.

5. The coherent optical transmitter of claim 1, wherein the transmission, to the adjacent coherent optical receiver, is configured for reception pre-Forward Error Correction.

6. The coherent optical transmitter of claim 1, wherein the information relates to hardware details of the coherent optical transmitter.

7. The coherent optical transmitter of claim 1, wherein the information relates to I/Q tributary mapping information.

8. A coherent optical receiver comprising circuitry configured to:
   receive symbols of a defined Digital Signal Processing (DSP) frame structure from an adjacent coherent transmitter,
   analyze a plurality of symbols of the received symbols, wherein the plurality of symbols includes repetition of the messages for prior to Forward Error Correction in a data path, and
   determine a message from the adjacent coherent transmitter based on the analysis of the plurality of symbols.

9. The coherent optical receiver of claim 8, wherein the plurality of symbols are one or more of reserved symbols, padding symbols, and undefined symbols in the DSP frame structure.

10. The coherent optical receiver of claim 8, wherein the repetition is in one or more of different polarizations, different DSP frames, and different symbols in a same DSP frame.

11. The coherent optical receiver of claim 8, wherein the plurality of symbols include any of parity and Cyclic Redundancy Check (CRC).

12. The coherent optical receiver of claim 8, wherein the message is determined pre-Forward Error Correction.

13. The coherent optical receiver of claim 8, wherein the information relates to hardware details of the coherent optical transmitter.

14. The coherent optical receiver of claim 8, wherein the information relates to I/Q tributary mapping information.

15. A method comprising:
   obtaining information for a message to be transmitted to an adjacent coherent optical receiver;
   modulating the information on a plurality of symbols that are part of a defined Digital Signal Processing (DSP) frame structure; and
   transmitting the DSP frame with the information modulated on the plurality of symbols, wherein the transmitting includes repeating the information for reception at the adjacent coherent optical receiver, prior to Forward Error Correction decoding in a data path.

16. The method of claim 15, further comprising
   receiving symbols of a defined Digital Signal Processing (DSP) frame structure from an adjacent coherent transmitter;
   analyzing a second plurality of symbols of the symbols; and
   determining a second message based on analyzing the second plurality of symbols.

17. The method of claim 15, wherein the plurality of symbols and the second plurality of symbols are one or more of reserved symbols, padding symbols, and undefined symbols in the DSP frame structure.

18. The method of claim 15, wherein the information relates to one or more of hardware details of the coherent optical transmitter and I/Q tributary mapping information.

* * * * *